(12) United States Patent
Struckman

(10) Patent No.: US 6,377,872 B1
(45) Date of Patent: Apr. 23, 2002

(54) APPARATUS AND METHOD FOR MICROWAVE IMAGING AND EXCAVATION OF OBJECTS

(75) Inventor: Keith A. Struckman, Grand Junction, CO (US)

(73) Assignee: BAE Systems Information and Electronic Systems Integration INC, Nashua, NH (US)

( * ) Notice: Subject to any disclaimer, the term of this patent is extended or adjusted under 35 U.S.C. 154(b) by 0 days.

(21) Appl. No.: 09/346,591

(22) Filed: Jul. 2, 1999

(51) Int. Cl.[7] .......................... G05B 15/00; G01S 3/02; E02F 3/04; E02F 3/64
(52) U.S. Cl. .................. 700/258; 342/459; 37/411
(58) Field of Search .......................... 700/245, 247, 700/258, 259; 342/450–453, 457–460; 37/394–398, 411, 415, 420–421, 443–444

(56) References Cited

U.S. PATENT DOCUMENTS

| | | | |
|---|---|---|---|
| 3,775,765 A | | 11/1973 | Di Piazza et al. |
| 4,072,942 A | | 2/1978 | Alongi |
| 4,698,634 A | | 10/1987 | Alongi et al. |
| 4,728,897 A | | 3/1988 | Gunton |
| 4,906,940 A | | 3/1990 | Greene et al. |
| 5,247,584 A | | 9/1993 | Krogmann |
| 5,287,430 A | | 2/1994 | Iwamoto et al. |
| 5,307,272 A | | 4/1994 | Butler et al. |
| 5,452,639 A | | 9/1995 | Aulenbacher et al. |
| 5,612,700 A | | 3/1997 | Tucker |
| 5,680,048 A | | 10/1997 | Wollny |
| 5,712,441 A | | 1/1998 | Grünewald |
| 5,713,144 A | * | 2/1998 | Haraoka ..................... 37/348 |
| 5,793,888 A | | 8/1998 | Delanoy |
| 5,907,111 A | * | 5/1999 | Josten et al. ................ 73/866.5 |
| 6,026,135 A | * | 2/2000 | McFee et al. ................ 376/159 |

OTHER PUBLICATIONS

Werbos, Backpropagation Through Time: What it Does and How to Do It, Proceeding of the IEEE, vol. 78, No. 10, Oct. 1990, pp. 1550–1560.

Lippmann, An Introduction to Computing with Neural Nets, IEEE ASP Magazine Apr. 1987, pp. 4–22.

WU et al, The Cylindrical Antenna with Nonreflecting Resistive Loading, IEEE Transactions of Antennas and Propagation, May 1965, pp. 369–373.

Vitebskiy et al, Ultra–Wideband, Short–Pulse Ground–Penetrating Radar: Simulation and Measurement, IEEE Transactions on Geoscience and Remote Sensing, vol. 35, May 1997, pp. 762–772.

* cited by examiner

*Primary Examiner*—William A. Cuchlinski, Jr.
*Assistant Examiner*—Thu Nguyen
(74) *Attorney, Agent, or Firm*—Scott J. Asmus; Vernon C. Maine

(57) ABSTRACT

A microwave imaging excavator for the detection, imaging and excavation of objects on or buried beneath the surface of the ground, such as metallic and dielectric land mines. A continuous wave stepped frequency ground penetrating radar signal is transmitted into the ground from a waveguide antenna mounted in one spade of a double spade auger. Direct breakthrough energy, signals reflected from the surface and the buried objects are received by an identical waveguide antenna mounted in the opposite spade. The spectra reflected from different buried objects become more distinct when the spectrum radiated spans the natural electromagnetic resonance of those objects. These signals are recorded as the twin-spaded auger is mechanically scanned over the ground in two mechanical rotational states of polarization. When the auger spades are on either side of a buried mine they are closed to grasp the mine which is then removed from the ground.

6 Claims, 11 Drawing Sheets

Surface and Object Scattering

Surface Scattering

APPARATUS AND METHOD FOR MICROWAVE IMAGING AND EXCAVATION OF OBJECTS

FIELD OF THE INVENTION

The present invention relates to the field of detecting buried objects using microwaves and the subsequent excavation of detected objects. More particularly, the invention relates to apparatus for imaging, identifying and excavating metal and non-metal buried objects such as landmines, pipelines and underground cables.

BACKGROUND OF THE INVENTION

The United Nations has estimated that there are more than 100 million mines distributed around the world, and they are a serious threat to life and limb long after the mines are buried during hostilities. For example, every year many people are maimed and killed by long forgotten mines that were buried in Vietnam, Cambodia, Somalia and Afghanistan. Metallic mines have typically been the easiest to detect but there are many types of non-metallic mines in use that require more advanced techniques such as ground search radar to reliably detect them. Accordingly, efforts have been and are being made to develop better apparatus and techniques for locating, identifying and removing both metallic and non-metallic mines.

Buried objects can be located using a wide variety of methods, including metal detectors and ground search radar. U.S. Pat. No. 5,452,639 to Aulenbacher, et al, discloses an apparatus and method for locating below ground munitions using magnetic sensors and ground search radar mounted on a relatively light weight, unmanned, remote-controlled vehicle, and the outputs of the sensors and radar are returned to a remote processing unit for analysis. However, once mines are located they must be removed by other means. U.S. Pat. No. 5,307,272 to Butler, et al, discloses a remotely controlled minefield detector system for detecting the presence of objects such as anti-personnel and anti-tank mines on the surface of the ground or buried just under the surface of the ground utilizing metal detector sensors and short pulse radar sensors, and the outputs of the sensors are returned to a remote processing unit for analysis. However, once mines are located they must be removed by other means.

Other patents that teach the use of ground search radar to locate objects under the surface of the ground are U.S. Pat. No. 5,712,441 to Grunewald that discloses a search apparatus that is attached to a military tank to detect electrically conductive mines and then detonate them using hollow charge explosives. The Grunewald apparatus does not attempt to remove mines unexploded. U.S. Pat. No. 5,680,048 to Wollny discloses a similar ground penetrating radar and metal detector device for detecting metallic and non-metallic objects on or below the ground surface. Once a mine is located it is marked and must be removed by other means.

The difficulty associated with measuring the echo from a buried target is it's small magnitude relative to the transmit antenna to receive antenna breakthrough, and signals reflected from the surface. The desired target signal is often almost completely masked by unwanted clutter signals. Signal processing systems shown in the prior art attempt to remedy this problem. U.S. Pat. No. 4,906,940 to Greene, et al, discloses a pattern recognition process and apparatus which automatically extracts features in displays, images, and complex signals.

Other patents that aid in object recognition include neural network technology. U.S. Pat. No. 5,612,700 to Tucker discloses a system for extracting targets from radar signatures that include high background noise/clutter with a combination of Wavelet technology and neural networks to filter out background noise. U.S. Pat. No. 5,287,430 to Iwamoto, et al, also discloses a signal discrimination device using a neural network for discrimination of input signals such as radar reception signals. U.S. Pat. No. 5,247,584 to Krogmann, discloses a signal processing arrangement for classifying objects on the basis of signals applied to a pair of neural networks. Other resources include the following journal articles and books: Werbos, P. J. "Backpropagation through time: what it does and how to do it," Porc. IEEE, Vol. 78 No. 10, October 1990. Lippman, R. P. "An introduction to computing with neural nets," IEEE ASSP Magazine April 1987. Wasserman, P. D. "Neural Computing," Van Nostrand Reinhod, New York, 1989. Wasserman, P. D. "Advanced Methods in Neural Computing," Van Nostrand Reinshold, New York 1993.

Other techniques to optimize the recognition of objects include the use of knowledge-based technology where a library of data is created and compared to received signals to identify objects. For example, U.S. Pat. No. 5,793,888 to Delanoy discloses a machine learning apparatus and method for image searching utilizing knowledge-based image processing. U.S. Pat. No. 5,287,430 to Iwamoto et al discloses a neural network for discriminating input signals, such as radar reception signals, and the neural network is trained to output specific codes for respective inputs.

In summary, the prior art teaches a number of ways to detect metallic and non-metallic objects such as antipersonnel and anti-tank mines, but no way to remove the mines without exploding them or manually excavating them.

OBJECTS OF THE INVENTION

It is an object of the invention to provide an improved method and apparatus for locating, identifying and removing objects, such as land mines, on or below the surface of the ground.

It is another object of the invention to reduce radio frequency clutter caused by reflections from the ground by narrowing the electromagnetic energy beam radiated and collected by the antennas.

A further object of the invention is to identify buried objects, such as land mines, by developing a library of artificial neural network weight connections for different type land mines created during training in various soil environments, and then comparing received radar images with the library for improved object recognition.

Additional objects of the invention will become apparent to those skilled in the art upon examination of the following detailed description and drawing, or may be learned by practicing the invention.

SUMMARY OF THE INVENTION

In accordance with the teaching of the invention, apparatus and a method is taught and claimed for detecting, imaging, identifying and excavating metal and non-metal objects on or buried beneath the surface of the ground, such as metallic and dielectric land mines. A remotely controlled robotic vehicle with movable arm is disclosed, and at the end of the arm is a double spade auger, each spade of which has a waveguide antenna mounted thereon and a ground penetrating radar signal is transmitted into the ground from a first waveguide antenna mounted in one spade of the double spade auger. Signals reflected from the surface of the ground and buried objects are received by an identical waveguide antenna mounted in the opposite spade of the auger. These signals are recorded as the twin-spaded auger is mechanically scanned over the ground in two mechanical rotational states for signal polarization purposes.

The recorded continuous wave signals are inserted into an artificial neural network (ANN) processor which has been previously trained with microwave signals reflected from objects on or beneath the surface of the ground in similar soil conditions. The microwave imaging and excavator system has a processor suite comprising a first ANN, a second ANN, and a general processor for controlling the operation of the system while it images, detects and excavates buried objects. The first ANN processor generates artificial neuron outputs that are processed to image the surface of the ground. The second ANN processor generates artificial neuron outputs that are processed by the general processor to image and identify objects buried in the ground, such as land mines.

The resultant image of a detected mine is compared to a library of images in order to identify the type of buried mine. If the present task is the excavation of the buried land mine, the spades of the auger are centered over the land mine and alternately rotated clockwise and counter-clockwise to auger down and around the mine. Image processing continues as the auger is steered over the object and during the process of excavation to prevent contact with the mine detonator. When the auger spades are on either side of a buried mine they are closed to grasp the mine which is then removed from the ground for disarming and disposal.

The ANN processor is trained by operating it over different types of soils and different types of known land mines or other objects, to develop correct weighting factors for the ANN processor to utilize in detecting and imaging the land mines or other objects. Alternatively, the connection weights may be calculated based on theoretical numerical electromagnetic computations of microwave signals reflected from the surface of the ground and buried objects such as land mines.

DESCRIPTION OF THE DRAWING

The invention will be better understood upon reading the following Detailed Description in conjunction with the Drawing in which.

DETAILED DESCRIPTION

While the following Detailed Description describes the use of the invention in imaging, detecting and excavating land mines, the invention has many commercial and industrial applications and may be trained to detect and recognize many other types of objects including, but not limited to, buried pipes and wires.

Figure 1:
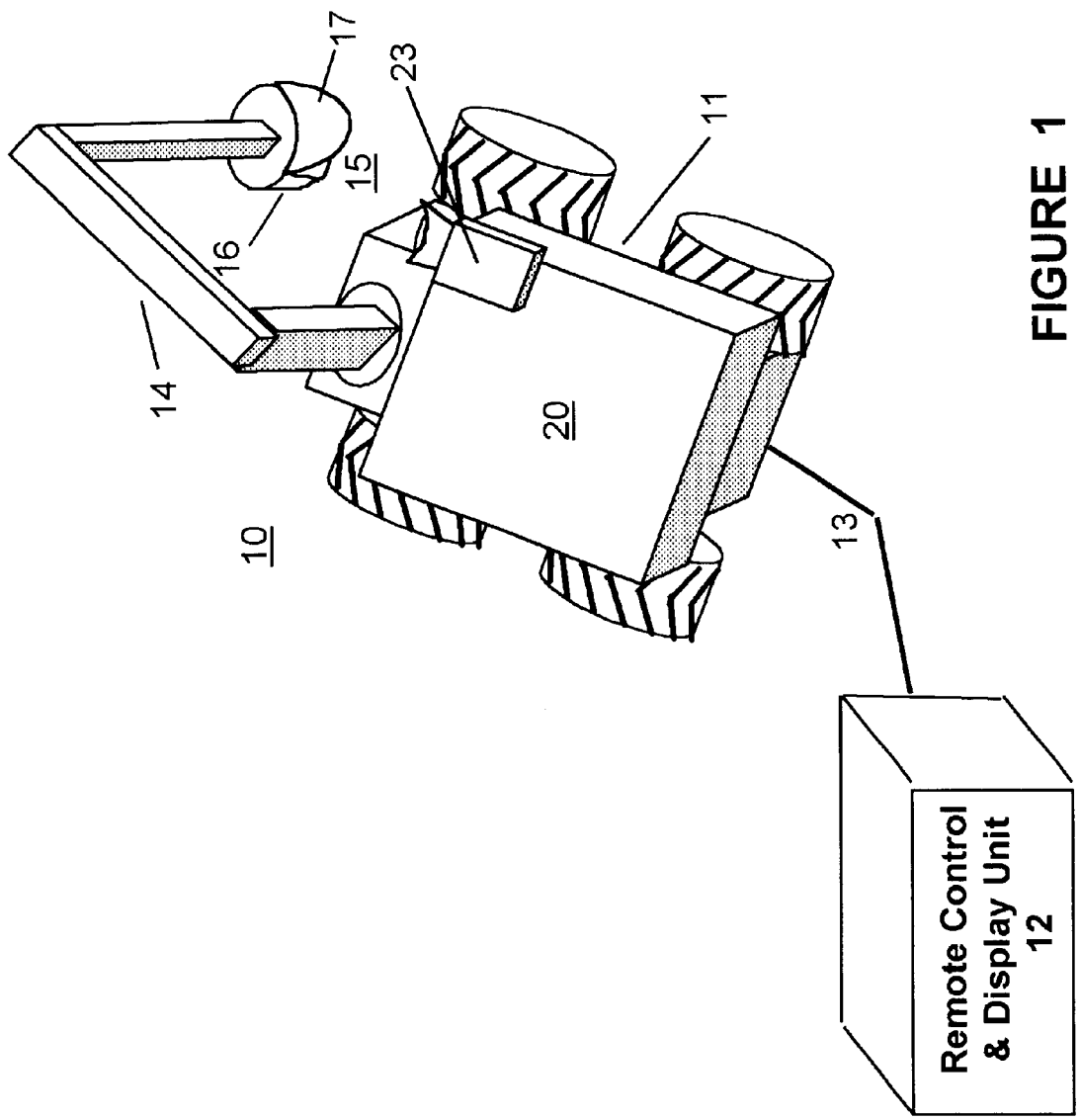
FIG. 1 is a three-dimensional drawing of an microwave imaging excavator system including a relatively light weight, unmanned, remotely controlled, robotic vehicle, and the system is used for land mine search, identification and excavation.

In FIG. 1 the microwave imaging and excavator system 10 basically comprises a relatively light weight, unmanned, remotely-controlled vehicle 11 and a remote control and display unit 12 that is electrically connected to vehicle 11 via cable link 13. The operation of vehicle 11 in locating, identifying and excavating anti-personnel and anti-tank mines or other objects is remotely controlled from control and display unit 12 by an operator (not shown) of system 10. Vehicle 11 is independently powered, or may be powered via cable 13, has the ability to traverse rough terrain, and has the ability to detect and image objects that are buried under rough surface terrain.

Vehicle 11 has a movable robotic arm 14 at the end of which is a cylindrical auger 15 having two curved spades 16 and 17. Attached to one spade is a transmitting antenna 18 and attached to the other spade of which is a receiving antenna 19. These antennas 18 and 19 are not shown in FIG. 1 but are shown and described in detail hereinafter with reference to other Figures in this detailed description. There is an electronics box 20 on vehicle 11 having: (1) a robotic arm controller 21 (not shown) to control the operation of robotic arm 14 responsive to signals sent from remote control and display unit 12 via cable link 13, (2) a microwave network analyzer 22 (not shown) for both generating ground penetrating radar (GPR) signals and processing reflected radar signals received by antenna 19 before they are sent via cable link 13 to remote control and display unit 12 for further processing to generate and image, and then identify the type of mine detected, and (3) a video camera 23 returning an image of the auger 15 work site to the equipment operator (not shown) at remote control and display unit 12. In operation, robotic arm 14 is scanned left and right as vehicle 11 moves slowly forward. At the same time GPR signals of a type described in more detail further in this detailed description are transmitted and received to detect land mines buried in the ground beneath antennas 18 and 19 mounted respectively in spades 16 and 17 of auger 15. In addition, while ground penetrating radar signals are being transmitted and received, auger 15 is rotated about it's axis for polarization scanning and is rotated about an offset axis for area scanning.

After a land mine (not shown) has been detected and imaged, down to a depth of in the order of thirty centimeters, while continuing to use the received radar signals auger 15 is positioned directly over the detected land mine and is controlled to excavate the mine without exploding it. To excavate the land mine auger 15 spades 16 and 17 are lowered and augered into the earth around the mine by alternately rotating auger 15 clockwise and counterclockwise. When augered into the ground a sufficient amount, as indicated by the radar return signals at receive antenna 19 and processed by the other elements of system 10, augering is stopped. The auger spades 16 and 17 are closed to grasp the sides of the mine, and robotic arm 14 is raised to withdraw the land mine from the ground. The land mine may then be set down on the surface of the ground or into a safety container (not shown) for easy removal and/or disarming by land mine disposal specialists.

Figure 2:
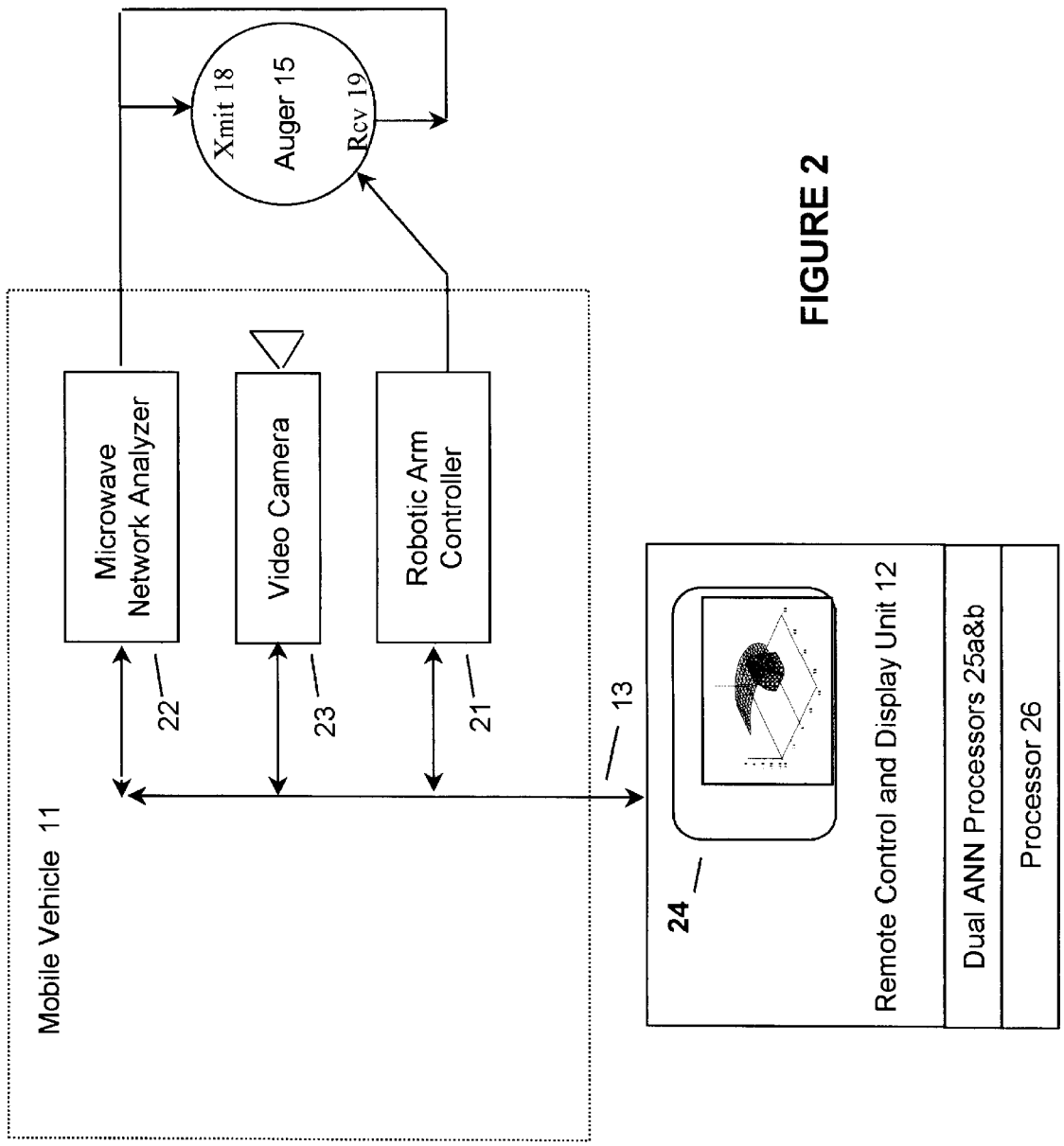
FIG. 2 is a block diagram of the microwave imaging excavator system components.

FIG. 2 shows a block diagram of the microwave imaging and excavator system 10. In response to signals received from remote control and display unit 12 over cable link 13, mobile vehicle 11 moves forward, backward and turns. Mobile vehicle 11 can also be connected to remote control and display unit 12 by either a radio link or a fiberglass transmission line. In addition, responsive to other signals from remote control and display unit 12, robotic arm controller 21 on vehicle 11 controls robotic arm 14 (not shown in this Figure) to move it in all directions. In addition, robotic arm controller 21 controls the movement of auger 15 and its spades 16 and 17. Spades 16 and 17 may be opened or closed to grasp and/or release a mine; and auger 15 may be alternately rotated clockwise and counter clockwise, while be lowered, to dig in around a mine, and also to provide a way to shift the polarization of the ground penetrating radar signals being transmitted into and received from the ground during the mine location and identification phase of the operation. Robotic arms and their operation are well known in the prior art so are not described in further detail herein.

Signals are also sent from remote control and display unit 12 over cable link 13 to control video camera 23, and video signals from camera 23 are returned via the same path to remote control and display unit 12 where the video image is displayed on display 24 to aid the operator in controlling the operation of mobile vehicle 11. Video camera 23 is preferably a high resolution camera, well known in the prior art, having pan, tilt and zoom capabilities that are controlled by the operator at remote control and display unit 12. In this manner the operator may observe the scanning and excavation work being performed, and can view the area or ground around vehicle 11.

Video display screen 24 (FIG. 2) is used to display: (a) the video signal output from video camera 23 on remotely controlled vehicle 11, (b) the received and processed microwave signal output as a result of the operation of microwave network analyzer 22, and (c) objects imaged by the combined processing efforts of ANN processors 25a & 25b and processor 26.

Microwave network analyzer 22 is the source of the ground penetrating radar (GPR) microwave radar signal transmissions, is used for microwave signal reception, and for microwave signal digital signal processing (DSP) measurement and processing functions. Analyzer 22 can advantageously be a Hewlett Packard Model 8510 Network Analyzer, which generates a stepped frequency output signal that is applied to transmit antenna 18 in auger 15 spade 16 for radiation into the ground. Because the transmit antenna 18 and receive antenna 19 are so close to the ground, power loss is minimal and the power of the signal output from analyzer 22 is sufficient for detecting land mines and other objects buried in the ground. Analyzer 22 outputs a continuous wave, stepped frequency, bistatic microwave signal. There is no need that the stepped frequency signals be evenly spaced, and the frequencies may be changed after analyzing initial signal returns. Typically the stepped frequency signal comprises about twenty frequencies between 0.8 GHz and 3.0 GHz. If the soil is dry the upper frequency may be extended to 4.0 GHz. Conversely, if the soil is wet and lossy, the lower frequency may be lowered to 0.4 GHz.

Located on remote control and display unit 12 is a video display screen 24, a keyboard (not shown) for control inputs from the system operator, dual Artificial Neural Network (ANN) processors 25a and ANN 25b, and a general processor 26 used in controlling the operation of the microwave imaging and excavator system 10 while performing the land mine locating, identifying and excavating functions.

The artificial neural network (ANN) processors 25a and 25b operate in conjunction with conventional processor 26 and are used to process signals output from microwave network analyzer 22 in order to provide images of objects that are on or buried beneath the surface of the ground and detected by the ground penetrating radar. The signals output from analyzer 22 are processed by ANN 25a to develop an image of the surface of the ground, and are concurrently processed by ANN 25b and processor 26 to develop an image of land mines buried in the ground, and processor 26 is used to identify objects by comparing the image to a pre-stored library of objects that are being searched for. In the preferred embodiment of the invention the objects being searched for are land mines, but other types of objects may be searched for and identified. To develop the library of objects being searched for, and especially including land mines, and their ANN connection weights, prior to actual use in locating, identifying and excavating live land mines, the microwave imaging and excavator system 10 is trained using buried inert land mines, buried in ground that is the same or very similar to the ground that will be searched for live land mines. Dual ANNs 25a and 25b process the signals output from microwave network analyzer 22, that has a preprogrammed set of frequencies that are known to be responsive to the buried inert land mines, to develop a set of connection weights for the dual ANNs for each known type of land mine to be searched for, and stores the connection weights in a library for later use in analysis and generation of images of detected live land mines.

Due to the fact that metallic objects provide a much stronger reflection signal than dielectric objects, ANN 25b analysis first looks for stronger signals reflected from metallic land mines, using connection weights that were trained under strong reflected signal conditions. If strong reflections are not observed, then ANN processor 25b changes to higher sensitivity based connection weights and develops images based on the weak signals reflected from dielectric (nonmetallic) plastic land mines.

Under most soil conditions the surface of the ground scatters much of the incident microwave energy. An extremely small part of the transmitted ground penetrating radar signal from transmit antenna 18 propagates into the ground, reflects from a buried object, re-traverses the soil to air interface and is received by receive antenna 19. Reflections from small surface irregularities tend to mask these small signals, making underground imaging very difficult. Our technique that first images the surface of the ground and then images buried objects tends to minimize the surface irregularity problem and provides more accurate buried object images.

Figure 3:
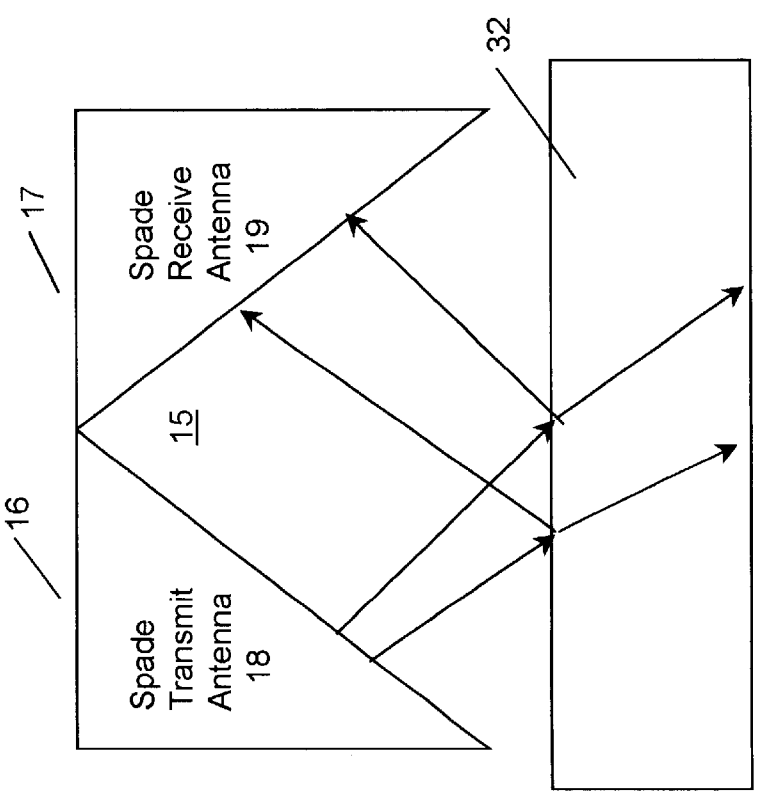
FIG. 3 shows a representation of the path followed by transmitted and received ground penetrating radar signals when there is no land mine beneath the auger mounted antennas and there is only ground scatter of the radar signals.

FIG. 3 shows a representation of the path followed by transmitted and received ground penetrating radar signals when there is no land mine beneath the auger 15 and there is only ground scatter of the radar signals. The ground penetrating radar signal transmitted by transmit antenna 18 is scattered from the surface of ground 32 and is received by receive antenna 19. The portion of the radar signal that passes into ground 32 is not reflected by anything and is absorbed.

Figure 4:
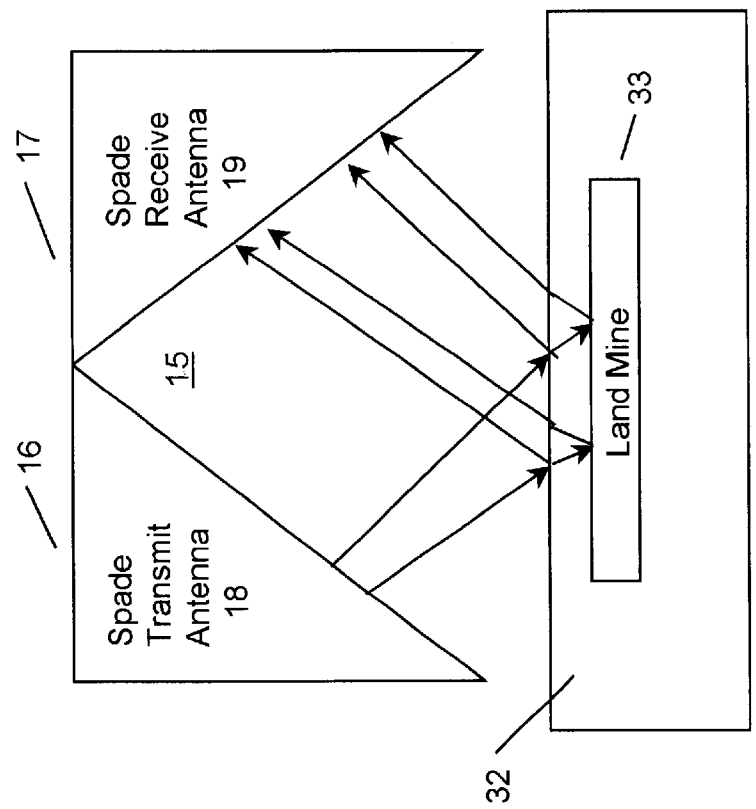
FIG. 4 shows a representation of the path followed by transmitted and received ground penetrating radar signals when there is a land mine buried beneath the auger mounted antennas and there is also ground scatter of the radar signals.

FIG. 4 shows a representation of the path followed by transmitted and received ground penetrating radar signals when there is a mine 33 beneath the auger 15 and there is also ground scatter of the radar signals. The ground penetrating radar signal transmitted by transmit antenna 18 is scattered from the surface of ground 32, is reflected by land mine 33, and both reflected signals are received by receive antenna 19. The curved shape of spades 16 and 17 (see FIGS. 5 and 6 ) act to focus the transmitted radar signal into a relatively narrow beam into the ground only beneath spades 16 and 17, and to shield out unwanted reflected radar signals.

Radar signals reflected from the surface of the ground have greater signal strength than signals reflected from objects in the ground due to signal losses in the ground, and are the first reflected signals received. Training of the first ANN processor 25a develops a first scan pattern, over an (x,y) grid of pixel points of output neuron values represented as "trixels" defining a surface. The surface "trixels" represent the distance from the spade tips to the surface of the ground 32 that reflected these stronger signals. By a process described hereinafter the second ANN processor 25b develops a second pattern of output neuron values at pixel locations that also contain strong reflected components plus reflections from buried objects in or on the ground. Subtraction of the first neuron pattern generated by the second ANN processor 25b from the second neuron pattern developed by the first ANN processor 25a exposes the pattern associated with a buried object, such as a land mine, which is then processed by processor 26 to create an image using the buried object trixels. To perform this operation artificial neural networks (ANN) 25a and 25b operate in parallel.

As has been previously described, auger 15 is first centered exactly over a detected and identified mine. It is then lowered toward the ground and is alternately rotated clockwise and counter-clockwise by robotic arm 14 to dig into the ground. After auger 15 has been augered into the ground around an identified mine, but not so far as to touch the mine actuating mechanism and detonate it, signals are sent from remote control and display unit 12 that cause the previously mentioned pistons to extend which causes spades 16 and 17 to rotate about their hinges 30a or 30b (shown in FIG. 5) to close toward each other. The result is that spades 16 and 17 firmly grip the sides of mine 33 (not shown) which is now positioned between the ends 16a and 17a (see FIG. 5) of spades 16 and 17 respectively. From the identity of the type of land mine its size is known so it is known how far to open and then close the auger spades 16 and 17 to properly grip land mine 33. Responsive to other signals received from remote control and display unit 12 robotic arm controller 21 causes robotic arm 14 to be lifted to extract land mine 33 from the ground. Arm 14 is then maneuvered to place the land mine on the surface of the ground or into a safety container (not shown). To release land mine 33 the last mentioned pistons are contracted to open spades 16 and 17. The land mine 33 is then removed or disarmed by mine disposal specialists.

Figure 5:
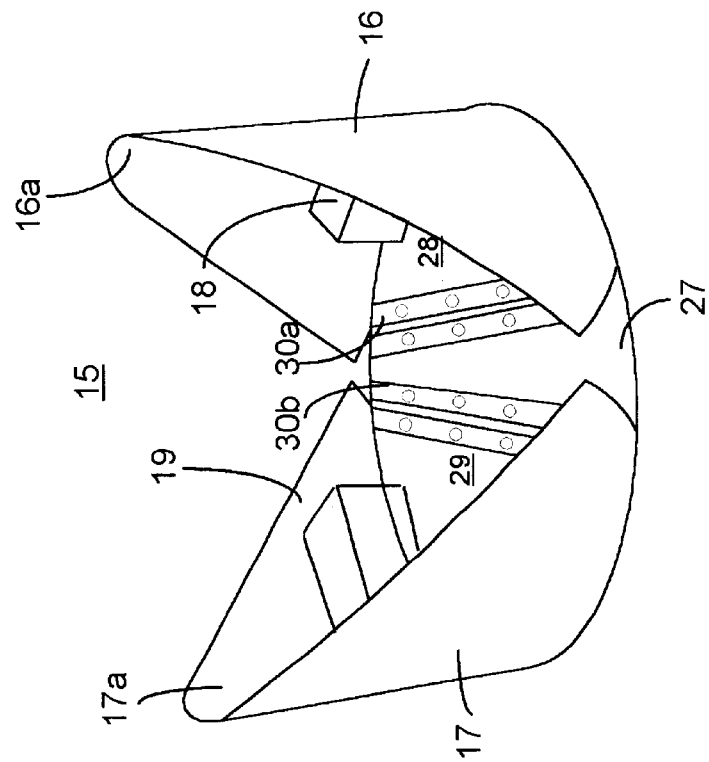
FIG. 5 shows an inverted view of an auger used on the unmanned, remotely controlled microwave imaging excavator, and each spade of the auger has an antenna that is used to focus transmitted and received ground penetrating radar signals to locate buried objects such as land mines, and then to excavate detected land mines.

In FIG. 5 is shown an inverted view of auger 15 with curved spades 16 and 17 and antennas 18 and 19. Transmitting antenna 18 is attached to the inner side of spade 16 to transmit the ground penetrating radar signals received from analyzer 22, and a receive antenna 19 is attached to the inner side of spade 17 to receive the radar signals reflected from the ground surface and buried objects such as land mine 33. Auger 15 has a base element 27 that is solidly attached to robotic arm 14 (not shown in this Figure). Spade 16 is solidly attached to a spade base 28, and spade 17 is solidly attached to spade base 29. Spade base 28 is attached to auger base 27 by a hinge 30a, and spade base 29 is solidly attached to auger base 27 by a hinge 30b. Spade bases 28 and 29 are each attached to an actuating piston (not shown) on robotic arm 14 (not shown in this Figure) and as robotic arm controller 21 actuates the pistons under control of signals received from the remote control and display unit 12, the spades open outward or close inward in a manner that is well known to those skilled in the robotics art.

Figure 6:
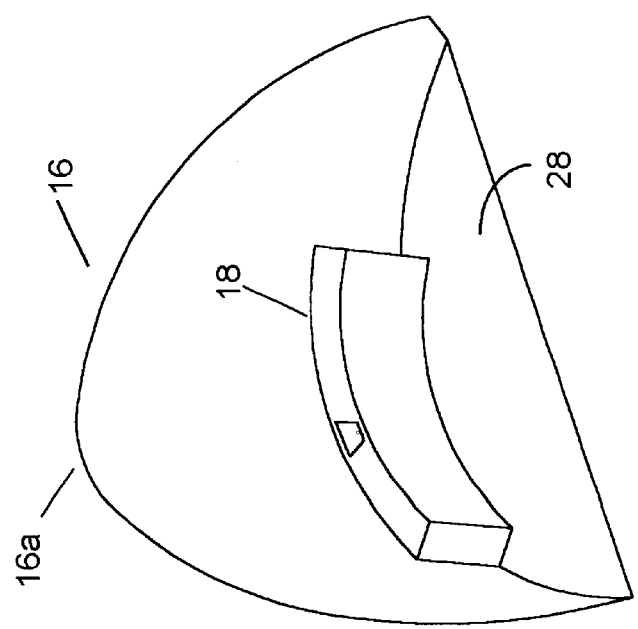
FIG. 6 shows an inverted view of one of the two identical spades of the auger showing more detail of a ground penetrating radar antenna mounted in the spade and used for radiating or receiving microwave energy to locate buried objects such as land mines.

FIG. 6 shows spade 16 and a better view of transmitting antenna 18 attached thereto. Only one spade is shown because the two spades are identical other than one antenna is used for transmitting and the other antenna is used for receiving the ground penetrating radar signals. The operation of transmitting antenna 18 and receiving antenna 19 is similar to antennas associated with a conventional bistatic radar system.

Key to the successful operation of microwave imaging and excavator system 10 is the performance of the broadband curved waveguide antennas 18 and 19 attached to spades 16 and 17 respectively. These antennas were designed using numerical electromagnetic code. Harrington developed Method of Moment (MOM) equations that numerically solve problems such as the design of a spade antenna and electromagnetic scattering. For more information see Harrington R., 1968, "Field Computations by Moment Methods," MacMillan, New York, 1968. His numerical approach uses either the Electric Field Integral Equations (EFIE) or the Magnetic Field Integral Equations (MFIE) to transform Maxwell's equations into a linear set of equations that when inverted and multiplied by excitation voltages yield antenna radiation and reception patterns. This operation is well known to those skilled in the art.

The frequency of the ground penetrating radar signals transmitted into the ground using transmitting antenna 18 span a wide radio frequency bandwidth limited only by the operational frequency band of antennas 18 and 19 and the depth of ground penetration by the radar signals. The spectra reflected from different buried objects become more distinct when the radiated RF illumination spectrum spans the natural electromagnetic resonance of the buried objects. In accordance with the teaching of the present invention, each waveguide antenna 18 and 19 is designed to operate from 0.4 to 4.0 GHz, although normal operation may occur over a smaller spectrum. Seven resistive cards are inserted into each waveguide antenna 18 and 19 to provide a low voltage standing wave ratio (VSWR) and accurate beamwidth control over this wide frequency bandwidth. The resistive cards forming the magnetic field complement the tapered resistive profile of the broadband cylindrical electric field dipole. This is well known in the art as may seen in T. T. WU and R. W. P. King, "The cylindrical antenna with nonreflecting resistive loading." IEEE Transactions, Antennas and Propagation, 1965, pp. 369–373. Antennas 18 and 19 have a polarization response that is primarily normal to the face of spades 16 and 17.

Figure 7:
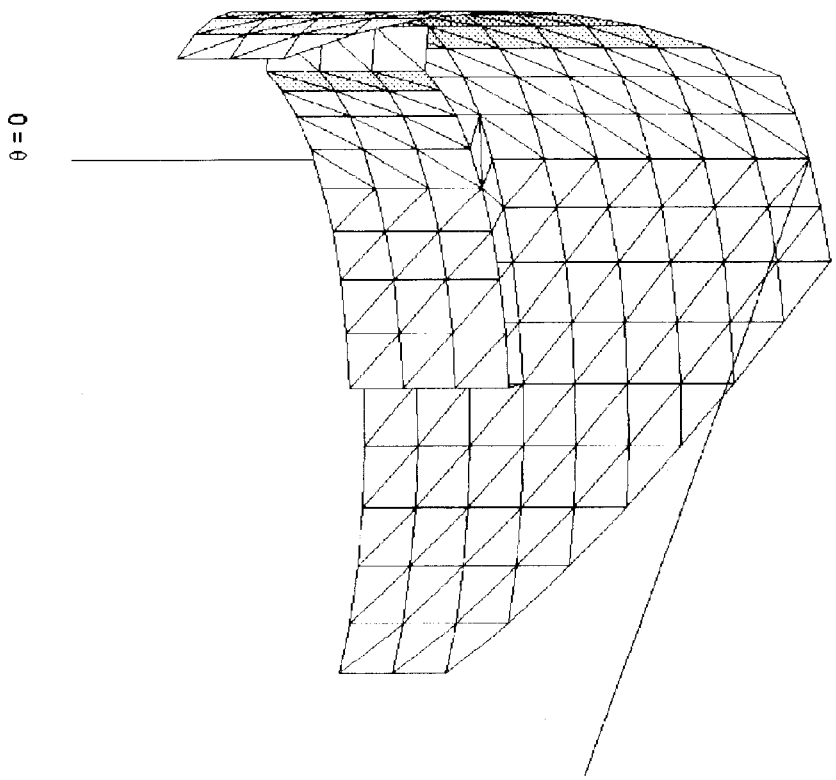
FIG. 7 shows an electromagnetic model of a spade and internal waveguide antenna.

FIG. 7 shows the electromagnetic model of a spade antenna pattern and internal waveguide antenna.

Figure 8:
FIG. 8 shows a theoretical $E_\theta$ 1.35 GHz antenna pattern of the ground penetrating radar antennas mounted in the auger spades.

FIG. 8 shows the theoretical $E_\theta$ 1.35 GHz antenna pattern in $\phi=0$ plane for antennas 18 and 19 mounted in spades 16 and 17. The radiated energy is primarily confined to the area between and below the spades 16 and 17 in a direction that will place maximum microwave illumination on a buried object such as mine 33 shown in FIG. 4. It should be noted that there are no reverse lobes, and the forward lobe is relatively narrow. This antenna pattern shows the attainment of a very important Ground Penetrating Radar antenna design goal, which is to transmit/receive antenna patterns that maximize radar target illumination and to reduce RF clutter from the terrain and objects located outside of the imaging area. Maximizing target to clutter ratios improve GPR detection, imaging and identification of buried objects such as land mines.

A conventional radar system typically radiates pulsed RF signals, whereas microwave imaging, in accordance with the teaching of the present invention, is based on the radiation and measurement of a distinctive set of stepped frequency continuous wave (SFCW) spectral lines. The microwave imaging and excavator system 10 identifies an object on or buried in the ground, and determines it's location by the character of the spectral returns recorded in the "near field" of the re-radiating object.

Figure 9:
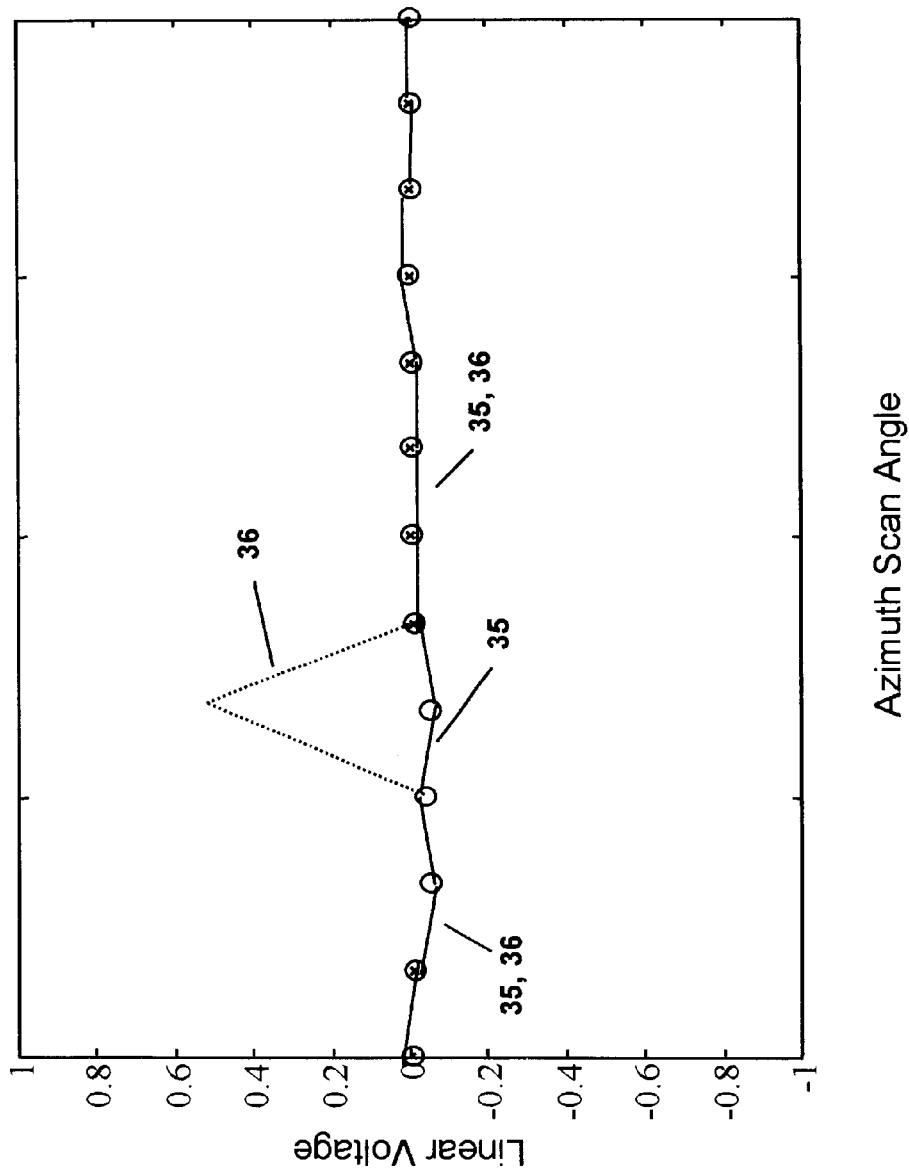
FIG. 9 shows voltages from a ground penetrating radar signal reflected off a bar buried in the ground with the augers and their antennas at a normal position and ninety degrees thereto at one frequency and one complete left-to-right and right-to-left scan of the auger.

FIG. 9 shows theoretically computed reflected voltage magnitudes versus azimuth scan angle, simulating the output from microwave network analyzer 22, operating at a single radio frequency, for two scans of auger 15 on robotic arm 14. One trace shown in FIG. 9 is with auger 15 in an un-rotated position, and the other trace is with auger 15 rotated ninety-degrees for polarization purposes as previously described. More particularly, FIG. 9 shows a theoretical 1.35 GHz radar signal reflected off a bar (not shown) in free space, with auger 15 at a position normal to the bar and at a position co-linear with the bar when auger 15 has been rotated ninety degrees. This simulates a pair of many different frequency scan signals received by microwave network analyzer 22 during an operational scan of auger 15. This pattern was generated by the numerical electromagnetic code used to calculate the spade antenna radiation pattern shown in FIG. 8. As briefly mentioned above, and as described in more detail hereinafter, robotic arm 14 scans auger 15 back and forth over the ground as vehicle 11 moves forward, and ground penetrating radar signals are transmitted, received and processed. After robotic arm 14 is scanned in one direction auger 15 is rotated ninety degrees to create a polarized scan and the same path is re-scanned by arm 14. With reference to FIG. 9, when the center of the faces of spades 16 and 17 and their antennas 18 and 19 are oriented perpendicular to the axis of the bar (not shown), there is little or no radar reflection from the bar. This is represented by trace line 35 that represents the magnitude of the signal reflected from the bar. As auger 15 is first scanned over the ground there is little change in the return signal. On the re-scan, with the auger rotated ninety degrees to the first scan, the center of the faces of spades 16 and 17 and their antennas 18 and 19 are now oriented co-axial to the axis of the bar in the ground, and there is a strong radar reflection from the bar as represented by the peak of trace 36 in the magnitude of the signal voltage. Land mines are generally round and the signal returns from them are the same for both positions of auger 15. In this manner object imaging ANN 25b is able to discriminate between a round object, such as a mine, and a linear object such as a bar, pipe, or piece of wire in the ground. In reality a bar or piece of wire would most likely be oriented to auger 15 at an angle other than normal or co-axial so there will be signal returns for both scans of auger 15, but there will be a difference between the amplitude and phase of the reflected signal that depend on the angle to the linear object. Ground reflections will modify the response shown in trace 35, but buried linear objects exhibit responses that are very polarization dependent relative to reflections from round or nearly round objects such as land mines.

The output signals from the microwave signal analyzer 22, which may advantageously be a Model 8510 analyzer, indicate the phase and amplitude of the radar return signal at each of a plurality of (x,y) grid points (pixels) as the robotic arm 14 and its auger 15 are scanned back and forth over the surface of the ground as the vehicle 11 moves slowly ahead. In addition, as mentioned previously, after each left-to-right or right-to-left scan of robotic arm 14, auger 15 is rotated ninety-degrees to effectively polarize the transmitted radar signal, and arm 14 is scanned back over the same path to gather a second set of phase and amplitude data. Rotation is required because at some orientations of a bar of metal in the ground to the antennas there is almost zero reflected radar signal return, but by rotating the antennas ninety-degrees the reflected radar signal return is much larger. All the received signal data from microwave network analyzer 22 is then sent over data link 13 to dual ANN processors 25a and 25b at remote control and display unit 12 for processing to image the detected object. In typical operation, with fourteen stepped frequencies being used, and there being quadrature and in-phase components for each frequency, there are twenty-eight vectors. In addition, when auger 15 with antennas 18 and 19 is rotated to get a ninety-degree polarized signal, twenty-eight additional vectors are generated for each (pixel) position over the surface of the ground. With vectors from the four nearest neighbors, there are a total of two hundred twenty four vectors input to the pair of ANN processors 25a and 25b for buried object detection and surface image development of an output value at each pixel location.

Figure 10:
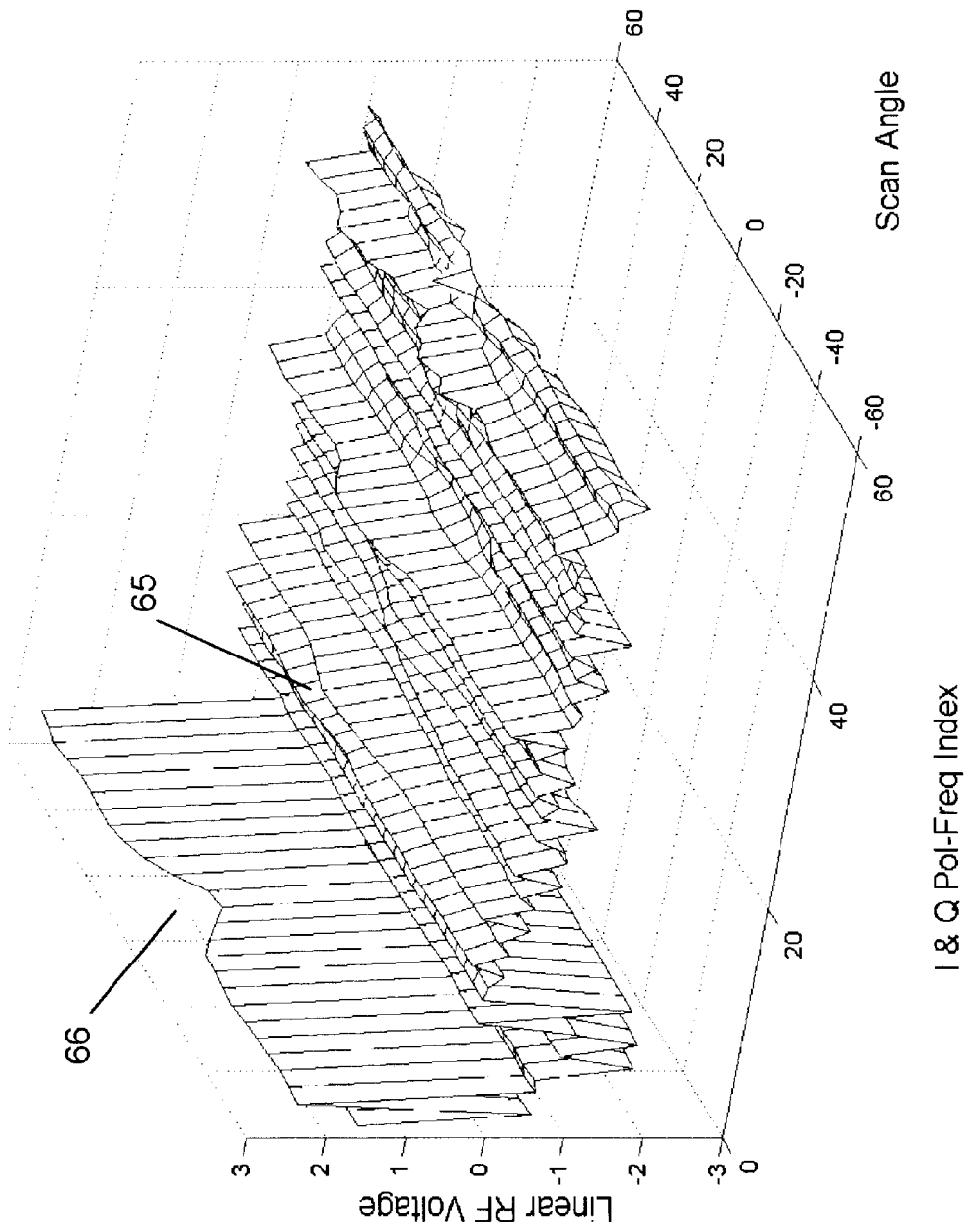
FIG. 10 shows a plot of the output from the microwave network analyzer and input to two ANN processors for one complete scan, including a polarization scan, of the auger and at the multiple frequencies utilized by the system.
Figure 13:
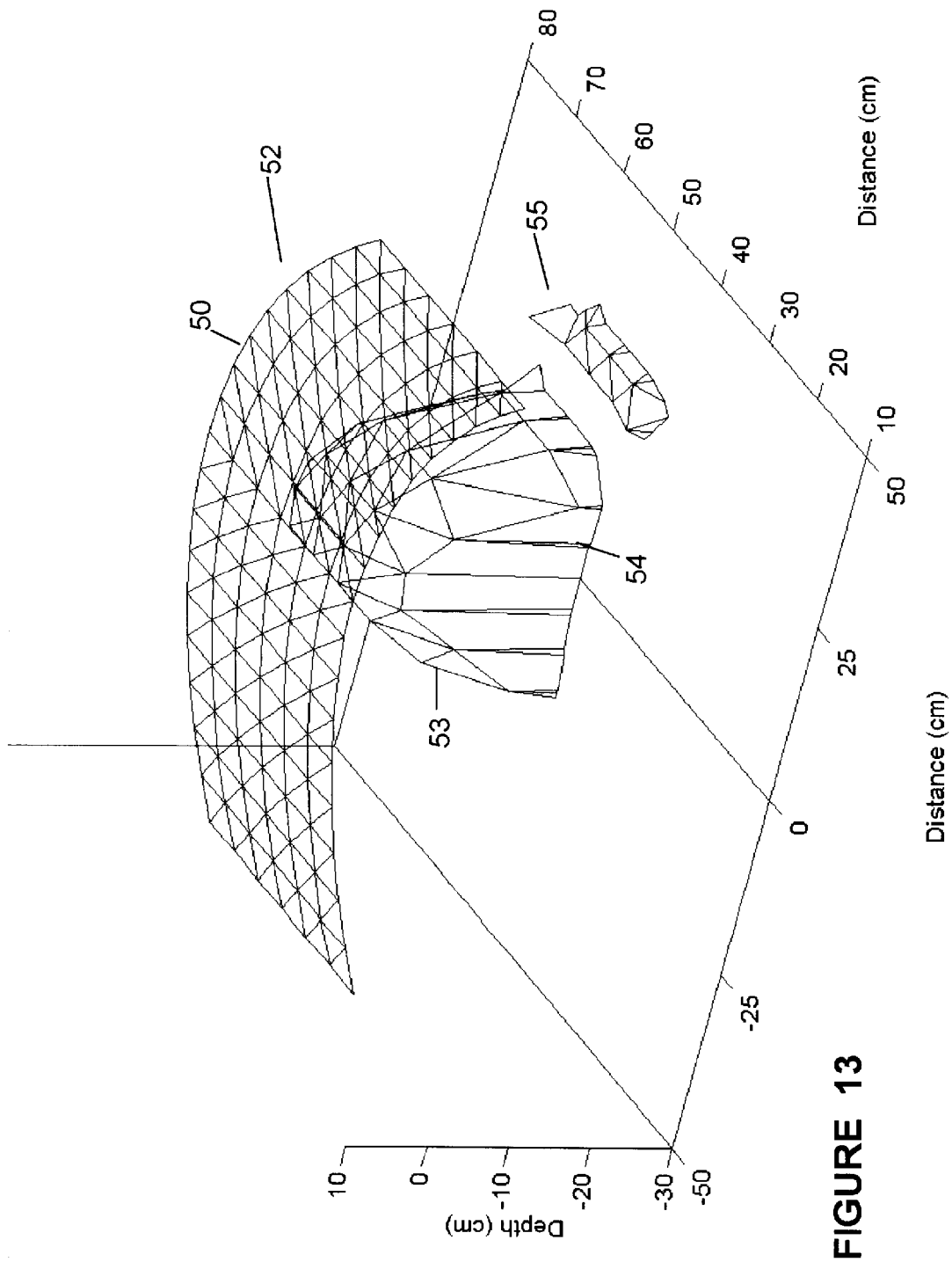
FIG. 13 is a computer-generated image of a buried land mine detected by using radar signals transmitted and received by the antennas in the augers, and processed by the two artificial neural network processors and a general computer processor.

FIG. 10 shows a plot of experimentally recorded ground penetrating radar signal returns at receive antenna 19 as a function of the auger scan left/right scan angle and at a location forward of remotely controlled vehicle 11 that places auger 15 directly over a buried land mine at an angle equal to 0 degrees. One axis is designated Scan Angle and shows the scan angle being plus or minus sixty degrees from the direction of forward motion of remote vehicle 11, and represents a scan width of approximately fifty centimeters to either side of the direction of movement of the vehicle. Another axis is the Linear RF Voltage and reflects the strength of the signals reflected from the ground and objects buried in the ground. The third axis is the I&Q (vectors), Polarization (Pol), and Frequency (Freq) Index. Here a total of fifty-six measured values at each scan index are shown. This set results from (14 frequencies)×(2 polarizations)×(2 I&Q values representing complex voltages)=56. A particular SFCW return can be viewed as the sum of numerous signal vectors including breakthrough, surface scattering and target scattering. An increase in signal level will occur if the target signal is in phase with the sum of all other vectors, such as at 65, but an out of phase condition will produce a reduction in signal level, such as shown at 66. Both of these effects can be observed in FIG. 10. As the auger is scanned over a buried metal land mine, a peak is produced at index 20 (65) and a large cancellation dip at index 3 (66). From the many vectors representing this information ANNs 25*a* and 25*b* are able to generate a pixel map of the height of the mine 33 below the surface of the ground, as shown in FIG. 13, after having first determined the surface of the ground from first ANN 25*a* trained on ground return signals. If the scan shown in FIG. 10 had been conducted over a metal bar in free space, then the magnitude of two pairs of I&Q Pol-Freq index lines would equate to traces 35 and 36.

Auger 15 with spades 16 and 17 is repeatedly scanned back and forth over a one-hundred centimeter wide swath (fifty centimeters to either side of center) while auger 15 is slowly extended away from vehicle 11 a distance of thirty centimeters. At each extension of arm 14 the signal output, such as that shown in FIG. 10, from microwave network analyzer 22 for each scan is stored in a memory associated with processor 26 in remote control and display unit 12. After the signals for this first plurality of scans is stored, ANN processors 25*a* and 25*b* commence their respective tasks of detecting the surface of the ground and the presence of mines or other objects in the ground and processor 26 attempts to identify same. If a mine or object is partially imaged near the end of the first plurality of scans, mobile vehicle 11 is moved forward a small amount, but not far enough to be over the top of mine and possibly explode it. Another second plurality of scans is accomplished which should encompass the entire mine. ANN processors 25*a* and 25*b* continue their task of detecting the presence of the mines and imaging same, and processor 26 attempts to identify detected mines by comparison with mine information stored in a library.

Figure 11:
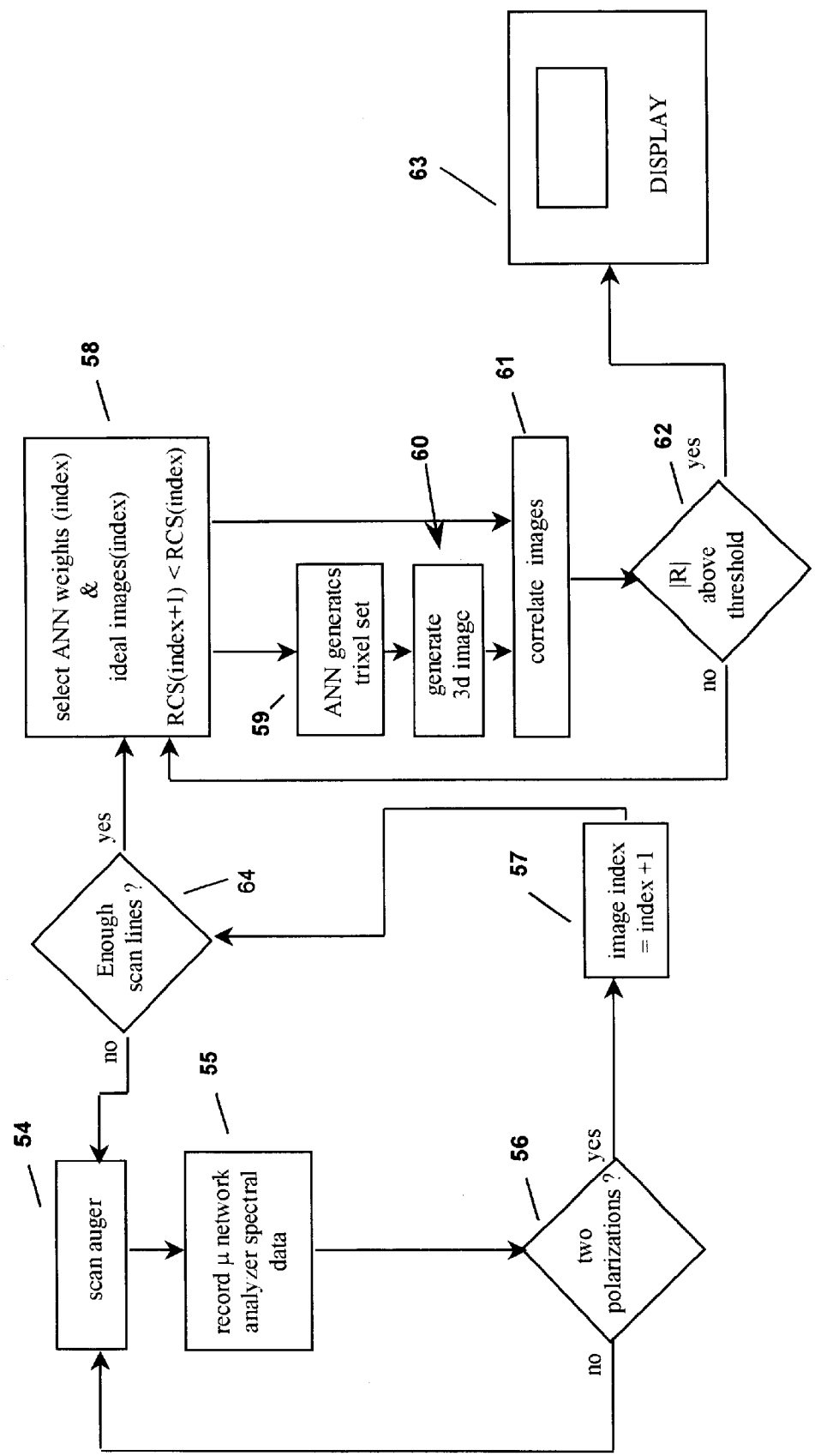
FIG. 11 is a block diagram of the operation of the microwave imaging excavator system, including the two artificial network processors, used to detect and identify land mines located with the apparatus of the present invention.

FIG. 11 is a flowchart of the signal processing used to image buried objects, such as land mines, by the artificial neural networks 25*a* and 25*b* using signals received from the microwave network analyzer 22. The operation of blocks 54, 55 and 56 are the scan functions previously described. At block 54 robotic arm 14 is controlled to scan auger 15 left to right, and right to left over the ground in front of vehicle 11. At block 55 the signals output from antennas 18 and 19 in spades 16 and 17 of auger 15 are processed by microwave analyzer 22 to produce spectral data which are returned over data link 13 to remote control and display unit 12 to be recorded. At block 56 a decision is made if the polarization scan has been made during which auger 15 is rotated ninety degrees and the same arc in front of vehicle 11 is re-scanned. If the decision is no, the program returns to block 54 where auger 15 is rotated, the scan repeated and the new spectral data stored at block 55. These steps are performed for the training operation and for the land mine detecting operation.

After the two scans have been performed, the decision at block 56 is yes, and the program progresses to block 57. Each set of scans is assigned an image index number at block 57 to identify them. At block 64 the number of scans are checked to see if there is a sufficient number, typically at least six, in the forward direction to form an image of a scanned area. If the answer is no the auger is extended forward and an additional scanning and measurement cycle conducted starting at block 54. If enough scans have been performed to form an image of a scanned area, the answer at decision block 64 is yes, and the operation proceeds to block 58.

At block 58 ANN connection weights are selected for and measured RF signals inserted into each of ANNs 25*a* and 25*b,* and neuron output patterns are calculated for both processors 25*a* and 25*b*. At block 59 ANN 25*a* and ANN 25*b* develop output neuron sets based on the selected connection weights and RF signals which are inserted into ANN 25*a* and ANN 25*b* at block 58. At block 60 general processor 26 takes the neuron output sets generated in block 59 and generates an image of the surface and a buried land mine 33, if one exists, such as shown in FIG. 13. At block 61 if an object image is generated by general processor 26 it is then compared to the stored library of images that are associated with that set of weights to identify the buried object. At block 62 it is determined if the buried object can be identified above a certain threshold of certainty. If the decision is no, the operation returns to block 58 to reselect ANN 25*a* and 25*b* connection weights and repeat the described procedure to image and identify the object. If the decision at block 62 is yes, the imaged object has been identified and the operation proceeds to block 63 where the identified object and information pertaining thereto is displayed on display 24 at remote control and display unit 12.

The ANN processors 25*a* and 25*b,* their connection weights and neural network node summations, represent a matched filter processing like a ranging system. This I & Q microwave signal processing brings together, in summation form, various spectral components of the received microwave signal that is equivalent to a distance measurement SFCW radar which determines the distance to a target by coherent summation of the phases and amplitudes of reflected signals. If the ANN developed image highly correlates to the image associated with a particular set of connection weights, the image is displayed. Low correlating images are rejected at block 62 and the next in a series of connection weights are inserted into the ANN processor 25*b* at block 58 and the image process through blocks 59–62 are repeated. If no buried object image is developed at the highest sensitivity weight setting, then the assumption is made that the scanned area does not contain any buried objects, and a new scan over the next adjacent area is initiated.

A very large trained ANNs 25*a*&*b* could in principle image the surface and all buried objects with a single set of weights, similar to the human brain that can, with a single set of neurons and education, sort and identify innumerable objects. Here the use of different sets of weights and frequencies for different conditions simplifies the training problem and decreases the size of ANNs 25*a*&*b* to one that will fit into available processor architectures.

Figure 12:
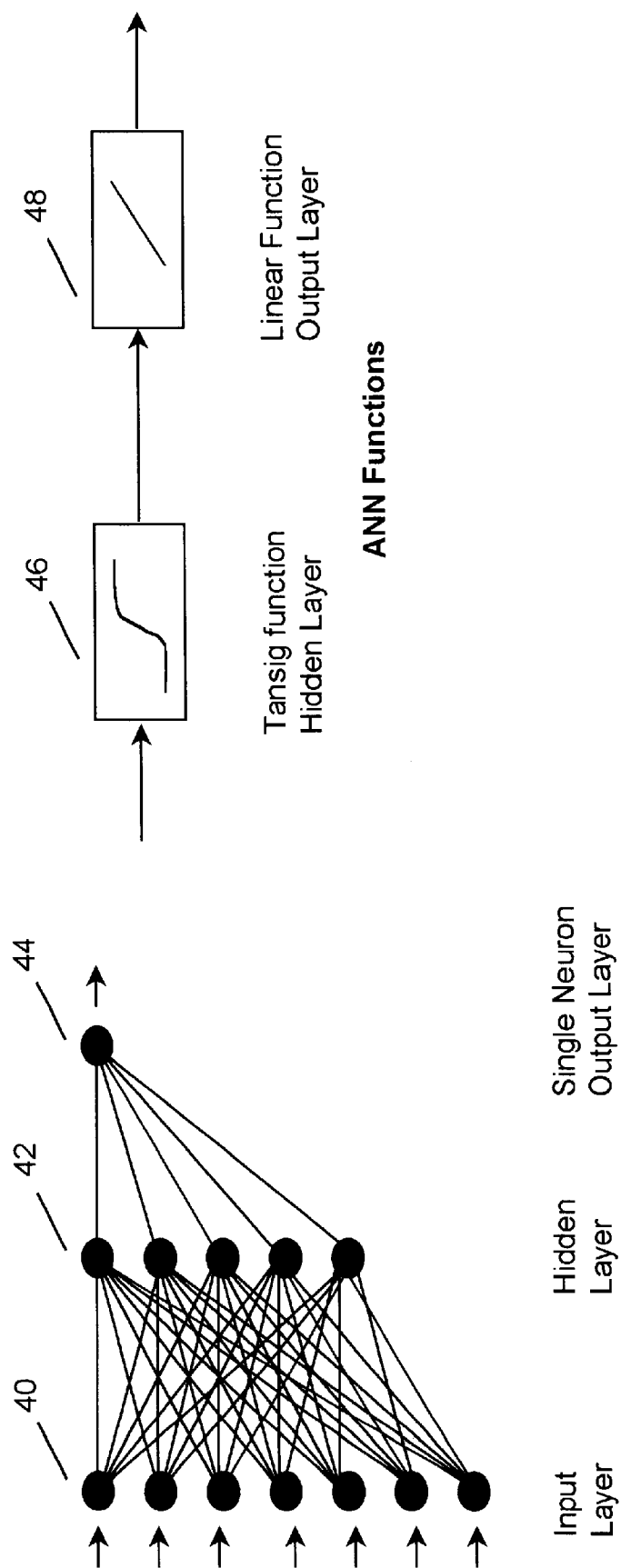
FIG. 12 is a general flowchart of the signal processing by each of the two artificial neural network (ANN) processors on received signals output from the microwave network analyzer.

FIG. 12 is a block diagram of the artificial neural network (ANN) processors 25*a* and 25*b* used to identify mines located with the apparatus of the present invention. The description of this Figure is mixed with the following description of FIG. 13 for better understanding.

In FIG. 13 the ground is imaged as a transparent surface 52 defined by lines that bound triangular patches. These surface images are generated by the height (z) of the triangular intersections, as output by the surface generating ANN processor 25a, and are herein called "trixels". The upper surface of buried objects are imaged as triangular patches 53 using the same equilateral (x,y) grid structure as the transparent surface shown. An imaged mine is shown as 54.

During imaging processing by ANN 25a in FIG. 12, the height of each surface trixel is given by the output layer neuron 44 of ANN 25a that uses as inputs the received/scanned I & Q voltage vectors, such as shown in FIG. 10, recorded during reception of reflected microwave signals from the ground and objects in the ground. As previously described, with fourteen stepped frequencies being used, and there being quadrature and in-phase components for each frequency, there are twenty-eight vectors. In addition, when auger 15 with antennas 18 and 19 is rotated to get a ninety-degree polarized signal, twenty-eight more vectors are generated for each pixel location within the surface area scanned. This is a total of fifty-six vectors. With the vectors from the four nearest neighbors, there is a total of two-hundred and twenty-four vectors input to ANN 25b for image development of an output trixel value at each pixel location.

Each trixel along a given arc in FIG. 13 is computed by the product of the microwave signals I&Q values and the ANN connection weights that, in FIG. 12, traverse from the input layer 40 (224 neurons) to the hidden layer 42 (3 to 6 neurons) and then to the output layer 44 as a single neuron. All surface pixels along a given radial arc use a common set of weights for the input layer 40 to the hidden layer 42 which is then output as a single neuron 44 that gives the imaged height at that location. This weight "overkill" provides maximum accuracy during imaging and excavation. The preferred embodiment of the invention uses hidden layer 42 neuron processing based on the "Tansig" function 46 as shown in FIG. 12. ANN 25a output neuron 44 uses linear function 48 to generate pixel heights in centimeters.

Our object imaging ANN 25b uses the same input vector set and interconnection patterns as the surface ANN 25a. The object imaging concept is based on the premise that if nothing is buried beneath the surface of the ground, then the object output neuron should have the same output level as the surface neuron for that location and experiment. When auger 15 is scanned over buried objects the voltage vectors will reflect a change from surface only scattering. Surface network training adjusts the weights to "weight out" these differences, while the object network is trained to accentuate these differences. Deeply buried objects reflect little energy, making the measured spectrums very similar to surface "only" responses. Therefore, object training patterns are set at the surface if buried objects are absent, near the surface if buried deeply, and stepped significantly below the surface if the object is metal and near the surface. To the first order, reflections from buried objects will decrease with burial depth because of electromagnetic attenuation, therefore the model chosen for object image depths is:

$$Z_{depth}(x_i, y_j) = \frac{1}{\alpha} \ln\left(\frac{abs(z_u(x_i, y_j) - z_s(x_i, y_j))}{ds}\right) \quad (1)$$

where:
$Z_{depth}(x_i, y_j)$=image trixel depth of the upper surface of an object
$Z_s(x_i, y_j)$=the level of the surface neuron
$Z_u(x_i, y_j)$=the level of the object neuron ds=step distance typically 10 cm for metal objects
α=a value that accounts for soil attenuation FIG. 13 was generated by a set of experimental measurements as an auger was scanned over a buried VS 2.2 dielectric land mine. This image was generated by set of $Z_s(x_i, y_j)$ surface and object $Z_{depth}(x_i, y_j)$=trixel values developed by the pair of ANN processors 25a and 25b in conjunction with general processor 26.

Figure 14:
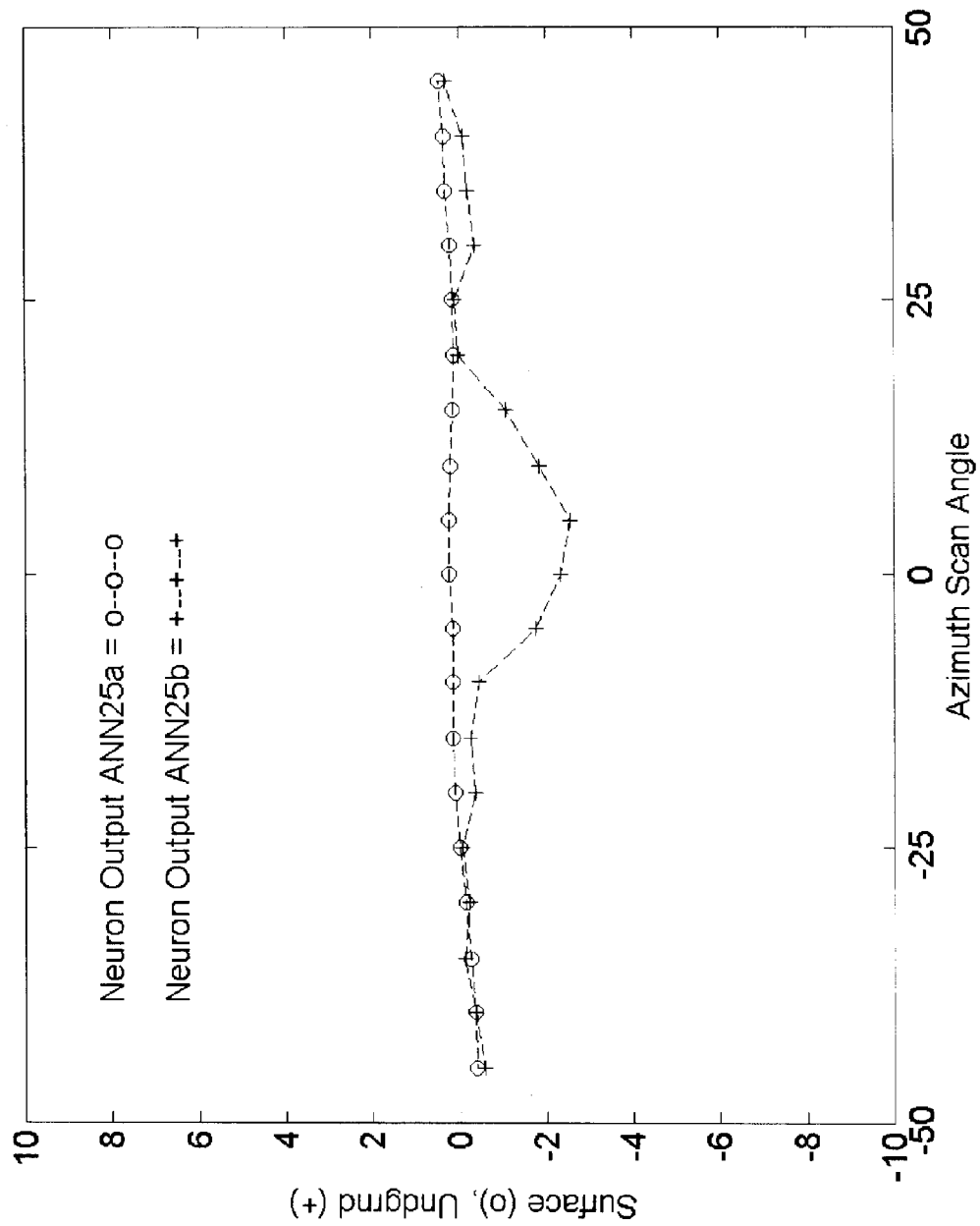
FIG. 14 shows an output signal from the output layer neurons of the two artificial neural network processors showing the presence of a mine and the surface of the ground and is used in conjunction with additional neural network output signals in the general processor to generate an image of the land mine.

FIG. 14 show the center contour output neuron values as the center of the auger is scanned directly over the dielectric land mine. Six additional scans, each separated in range by five centimeters, completed the area scan over the land mine as shown in FIG. 13. The resultant trixel values based on the insertion of these neuron values into equation (1) and computed over these seven contours develops the image of the land mine and the ground surface that it was buried beneath, such as shown in FIG. 13. During imaging operations the height of each surface defining trixel is given by the output neuron of an artificial neural network that uses as inputs the received/scanned I & Q voltage vectors recorded during stepped frequency, continuous wave microwave signal transmissions and sector scanning operations as output from microwave network analyzer 22. Object imaging is based on the difference between the height of the ANN 25a surface trixels and ANN 25b output neuron object trixel values FIG. 13 shows the image of a dielectric land mine that was buried 7 cm below the surface of the ground. The ground surface, at z=0, is displayed as triangular grid of lines 50. Buried objects are imaged as triangular patches 52 that define the objects' upper surface. This particular surface image is identified by a grid of 7×19=133 pixel locations that cover a one meter swath width generated by a +/−45 degree azimuth scan at a 70 cm radial distance and a 0.30 meters length in the radial direction. FIG. 13 also shows a line of clutter 55 at a depth of approximately 30 centimeters. This is typical of buried object image resolving limitations, either another object is buried at this depth or surface/subsurface clutter masquerades as a buried object. In this particular case, clutter at this level would have no effect on the ability to image and excavate this dielectric land mine.

The stored signals received from microwave network analyzer 22 are processed multiple times each with a set of different ANN connection weights input to ANN 25b to image mines and other objects that may buried in the ground. The set of weights represent least sensitive to most sensitive settings used in the analysis of the stored signals. Initially, when ANN processor 25b processes stored signals received from microwave network analyzer 22, the weight connections input to the artificial neural network is set trained on objects having the largest radar cross section (RCS), which equates to the least sensitivity. With least sensitivity the ANN processor 25b can detect metallic mines, but not dielectric mines. If no metallic mines are detected, connection weights based on lower RCS buried targets, an increase in sensitivity, and the stored signals re-processed. Step by step lower RCS target weights are sequentially inserted through a range making the analysis performed by ANN 25b increasingly sensitive. In this manner metallic and non-metallic (dielectric) mines will be detected. If no mines are detected the operator of equipment 10 causes mobile vehicle 11 to be moved forward over the ground that has already been scanned and commence performing another set of scans covering 30 more centimeters. If an object is detected that is not identified as a mine, such as a pipe or wire, the operator of equipment 10 at remote control and display unit 12 must make a decision what is to be done, if anything, before commencing with mine detection, identification and removal.

When imaging in unknown soil conditions the system can be used to self calibrate, a metal plate is placed on the ground with a container having four inches of soil of the soil type that will be scanned while looking for mines. The system is operated over this soil sample to determine the reflected signal return and the information is used in picking the correct weighting factors for ANNs 25a and 25b. In addition, the amount of moisture in the soil will affect the level of reflected signal return. Wet soil will absorb microwave energy and dry soil will pass the greatest amount of microwave energy. In addition, higher frequencies of microwave energy will be absorbed more than lower frequencies in wet or damp soil. Thus, if the soil that will be scanned is wet, the multiple frequencies that will be utilized when scanning the ground in front of mobile vehicle 11 will be in the range of 0.5 GHz to 2.5 GHz. If dry soil is to be scanned the multiple scan frequencies that will be utilized will be in the range of 1.5 GHz to 4.0 GHz. This information is input to system to select the optimum set of frequencies for the prevailing soil conditions. Furthermore, the power level of the microwave radar signal output from microwave network analyzer 22 and applied to transmit antenna 18 may be changed. When wet soil conditions are experienced the power of the transmitted signal may be increased by the operator of equipment 10.

ANN 25b makes an image of the width of a detected mine. Anti-tank mines are in the order of thirty centimeters in diameter and anti-personnel mines are typically in the order of five to ten centimeters in diameter, and all types of mines are typically buried no more than five to ten centimeters below the surface of the ground. Larger mines, such as the anti-tank mines, provide a larger reflected signal return, and smaller mines, such as anti-personnel mines, provide a smaller signal return. In addition, metallic mines provider a larger reflected signal return than non-metallic mines. As described above, image sensitivities are, by the use of lower RCS target training, to image non-metallic mines. With the type (metallic or non-metallic) and diameter of mine being known, and appropriate connection weights selected, the final display of the mine and the determination of what type the mine can be determined from the library of mine information.

After the mine type has been determined, the operator then controls remote controlled vehicle 11 to center auger 15 over the mine. Mine imaging is continued to accomplish this. When auger 15 is centered over the mine, auger 15 is lowered slowly toward and into the ground while spades 16 and 17 are alternately rotated clockwise and counter-clockwise. When spades are inserted into the ground to be on either side of the detected mine, spades 16 and 17 are moved to grasp the mine as previously described. The mine is then removed from the ground.

ANN Training

Supervised training is used in back propagation artificial neural network (ANN) training. Therefore, a training set is required consisting of vector training pairs. Each training pair is composed of an input vector X and a target vector T. The target vector T represents the set of values desired from the network when the input vector set X is applied. The object of training is to adjust artificial neural network (ANN) weight matrices so that the networks actual output is like the desired T vector output. More formally, the back propagation algorithm minimizes error measured between the target vector and the output vector. The square error measure (SSE) used in these ANN training sequences is given by the equation:

$$SSE = \sum_i \{T_i - ANN25(\text{out})\}^2 \quad (2)$$

The back propagation training algorithm uses gradient descent to change each ANN weight in a direction that minimizes square error measure (SSE) as described by equation (2) immediately above. Back propagation is, in essence, a method for calculating the gradient vector. It takes advantage of the unique structure of the feed-forward ANN structure shown in FIG. 12. The gradient vector is calculated on a layer to layer basis using the chain rule for partial derivatives. Back propagation networks can be slow to train, often requiring days or weeks of training time. A number of methods significantly reduce training time, the most important being the acquisition of "good" starting weights, an obvious observation since accurate starting weights obviate the need for training. Conventional ANN training starts with network weights set to small random numbers, which in general must be excessively trained to meet target vector accuracy's. Closed form ANN starting weights that markedly reduce the training time for ANN 25a weights and almost meet microwave imaging surface accuracy requirements are computed in closed form by the method described below.

X vector training measurements for the microwave imaging excavator 10 are the microwave signals represented by the I&Q (vectors), Polarization (Pol), and Frequency (Freq) index patterns similar to the example shown in FIG. 10. ANN 25a target vectors are simply the distances from the tips of the auger to the surface of the ground. ANN 25a starting weight computations are based on three sets of input vector X measurements at a single pixel location, each measurement at a different spade height above the surface. Typically input vector set (X1) is recorded at a target vector height of T(1)=5 cm, input vector set X(2) is recorded at a target vector height T(2)=10 cm, and input vector set X(3) is recorded at target vector height T(3)=15 cm. Starting weights are computed that make ANN 25a outputs exactly equate to these heights as these X measurements are sequentially input to ANN 25a. Starting weights between the input layer 40 to the hidden layer 42 are zero except for the first of those connecting to the first three layer neurons. The weights Wi(1:224,1) between the input layer 40 and the first hidden layer 42 neuron h(1) are set equal to an input vector set X(1) divided by input power delivered by vector set X(1). Wi(1:224,2) weights to second hidden layer 42 neuron h(2) are set equal to input vector set X(2) divided by the power delivered by input vector set X(2). Wi(1:224,3) are computed in a similar manner but with an input vector set X(3) set of measurements. All neuron biases are set equal to zero except for hidden layer 42 neurons b1, b2 and b3 which are set to −0.5. At this point the exact fit is determined by the three interconnection weights between the hidden layer 42 and the single ANN 25a linear output neuron 44. This exact fit is computed by cycling through the input data sets of all three input vector sets X while the interconnection weights are sequentially set to [1, 0, 0], [0, 1, 0] and [0, 0, 1] and the neuron output of ANN 25a is recorded as Nuo(1:3,1:3) of these nine states. The hidden layer 42 to output layer 44 starting weights $W_{ho}(1:3)$ that make an exact fit to the three T target heights are calculated by:

$$\begin{bmatrix} W_{ho}(1) \\ W_{ho}(2) \\ W_{ho}(3) \end{bmatrix} = \begin{bmatrix} Nuo(1,1) & Nuo(1,2) & Nuo(1,3) \\ Nuo(2,1) & Nuo(2,2) & Nuo(2,3) \\ Nuo(3,1) & Nuo(3,2) & Nuo(3,3) \end{bmatrix}^{-1} \begin{bmatrix} T(1) \\ T(2) \\ T(3) \end{bmatrix} \quad (3$$

Weights $W_i(:,:)$ and $W_{ho}(:)$ provide accurate output neuron 44 values that equate to the exact height of the surface for the three experimental conditions. Scanning over slightly different soils that contain surface and subsurface clutter decreases this accuracy. Even under these conditions accurate surface height images can be and are formed by supervised training that uses input vector set X measurement data that were recorded that were recorded under non-ideal clutter and buried object conditions.

The second most important ANN training time reduction technique is the method used to compute the gradient descent direction. Back propagation's conventional convergence path follows the error function's direction of steepest descent. In many cases this is not the most direct route. By making use of conjugate gradient based, second derivative information, as well as the rate of change of the slope, training times have been reduced by several factors often. Conjugate gradient at descent proceeds not down the gradient but instead in a direction that is conjugate to the direction of the previous step. The minimization done on the previous step is not undone by the next step since the gradient stays perpendicular to the previous step. Conjugate gradient based training is the training method of choice for both ANN 25a and ANN 25b weight generation.

ANN 25b target vectors are the $Z_u(x_i, y_j)$ values computed by the inverse of equation (1). Weights trained for ANN 25a are used for ANN 25b starting weights, resulting in accurate training in minimal time. Accurate and robust ANN 25b training requires the scanning and ground penetrating radar signal recording over numerous areas where land mines are absent and areas where land mines are buried at known depths. To accurately determine mine depth, similar mine types must be buried at multiple known depths. Scanning over areas where mines have not been buried is used to train for the no-image condition. Training for different soil conditions is also required. Different stepped frequency continuous wave radar illumination is necessary for the adaptation to changing soil conditions such as wet, dry, loam, clay etc. Buried metal objects create large reflections of incident microwave energy that swamp out ANN processing that was initially trained with small metal or dielectric (non-metal) objects. Therefore, different training sets are required for different types of objects under different types of soil conditions. To prevent over fitting, the pixel size of the training area for a particular mine type should exceed the number of neuron weight connections preferably by a factor of two.

The microwave imaging and excavator system 10 that is used for imaging is also an ideal unit for the acquisition of ANN training data and subsequent training. It is common practice to use the same ANN processing architecture for both training and subsequent processing. Advances in numerical electromagnetic code is making complex RCS buried target computations increasingly accurate. See S. Vitebsky, L. Carin, M. Ressler and F. Lee, "Ultra-wideband, short-pulse ground-penetrating radar: Theory and Measurements", *IEEE Trans. Geosci. Remote Sensing*, vol. 35. pp. 762–772, May 1997. Accurate theoretical data would eliminate the need for experimental ANN training measurements.

While what has been described hereinabove is the preferred embodiment of the invention, it will be apparent to those skilled in the art that numerous changes may be made without departing from the spirit and scope of the invention.

What is claimed is:

1. Movable imaging and excavating apparatus for locating and removing objects on the surface or in the ground, said apparatus comprising:
   a remotely controlled unit with movable arm;
   an auger movably attached to said arm, said auger having a first spade and a second spade;
   a first antenna mounted on said first spade, said first antenna for transmitting electromagnetic energy into the ground;
   a second antenna mounted on said second spade, said second antenna for receiving said electromagnetic energy reflected from objects on the surface or in the ground beneath said auger; and
   wherein as said apparatus moves said arm above the ground in a scanning pattern said reflected electromagnetic energy is received by said second antenna indicating the presence of a first of said objects beneath said auger, and
   wherein said arm is moved to position said auger over said first of said objects, said auger is inserted into the ground around said first object, and said first and said second spades are moved toward each other to grasp said first object and said auger is then moved to withdraw said first object from the ground.

2. The invention in accordance claim 1 wherein said auger has a first position and a second position in which it can be oriented, and said auger is initially in said first position to transmit said electromagnetic energy with a first polarity, and after said apparatus moves said arm above the ground in a scanning pattern with said auger in said first position to locate said first object, said apparatus rotates said auger to said second position and said imaging and excavating apparatus again moves said arm above the ground in said scanning pattern with said transmitted electromagnetic energy now having a second polarity.

3. The invention in accordance with claim 2 wherein said imaging and excavating apparatus further comprises means for rotating said auger and thereby rotate said first and said second antennas mounted thereon to transmit said electromagnetic energy at said first polarization and then at said second polarization.

4. The invention in accordance with claim 3 further comprising means for analyzing said received electromagnetic energy from said first and said second polarization to determine the existence of said first object beneath said auger.

5. The invention in accordance with claim 4 further comprising means for storing signals representative of each of a plurality of said objects.

6. The invention in accordance with claim 5 further comprising means for comparing said received electromagnetic energy of said first and said second polarity with said signals stored in said storing means to identify said first object.

* * * * *